United States Patent
Usoro et al.

(10) Patent No.: US 6,318,531 B1
(45) Date of Patent: Nov. 20, 2001

(54) MAGNETORHEOLOGICAL FLUID CLUTCH

(75) Inventors: Patrick Benedict Usoro; Anthony L. Smith; Chi-Kuan Kao, all of Troy, MI (US); George Moser, Wixom; Gordon Sommer, Plymouth, both of MI (US)

(73) Assignees: General Motors Corporation, Detroit; Behr America, Inc., Webberville, both of MI (US)

( * ) Notice: Subject to any disclaimer, the term of this patent is extended or adjusted under 35 U.S.C. 154(b) by 0 days.

(21) Appl. No.: 09/598,327

(22) Filed: Jun. 20, 2000

(51) Int. Cl.[7] .................................................. F16D 35/00
(52) U.S. Cl. .......................................... 192/21.5; 192/58.4
(58) Field of Search .................................. 192/21.5, 58.4, 192/58.61, 58.7

(56) References Cited

U.S. PATENT DOCUMENTS

| | | | |
|---|---|---|---|
| 4,227,861 | 10/1980 | LaFlame | 416/169 A |
| 4,285,421 | 8/1981 | Halsted | 192/84 C |
| 4,302,156 | 11/1981 | LaFlame | 416/169 A |
| 4,310,085 | 1/1982 | LaFlame | 192/58 B |
| 4,664,242 | 5/1987 | Downs | 192/106 F |
| 4,681,197 * | 7/1987 | Pedu | 192/21.5 |
| 5,234,090 | 8/1993 | Haka | 192/70.25 |
| 5,598,908 * | 2/1997 | York et al. | 192/21.5 |
| 5,823,309 | 10/1998 | Gopalswamy et al. | 192/21.5 |
| 5,845,752 | 12/1998 | Gopalswamy et al. | 192/21.5 |
| 5,848,678 * | 12/1998 | Johnston et al. | 192/21.5 |
| 5,896,964 | 4/1999 | Johnston et al. | 192/21.5 |
| 5,896,965 | 4/1999 | Gopalswamy et al. | 192/21.5 |
| 5,960,918 * | 10/1999 | Moser et al. | 192/58.4 |
| 6,032,772 | 3/2000 | Moser et al. | 192/21.5 |

* cited by examiner

Primary Examiner—Charles A. Marmor
Assistant Examiner—Saúl J. Rodríguez
(74) Attorney, Agent, or Firm—George A. Grove; Jeffrey A. Sedlar

(57) ABSTRACT

A viscous clutch of the magnetorheological fluid type includes an input drive member and an output driven member. A selectively energizable magnetorheological fluid is disposed in a working gap between one cylindrical member on the input member and two cylindrical members on the output shaft. A slip ring configuration on the output member is provided to permit the introduction of electrical energy to a coil assembly disposed on the output member, which coil is energized to establish a magnetic field in the working gap, thereby energizing the magnetorheological fluid. Wiper structures on the input and output members prevent the accumulation and/or centrifugal packing of the iron particles in the magnetorheological fluid adjacent the axial ends of the cylindrical members. A cavity for excess magnetorheological fluid or fluid draining from the working gap is provided between opposed members of the output member. One of the opposed members has an angular wall portion diverging toward the working gap to direct fluid into the working gap when the output member is rotating. The input member includes a finned hub portion rotatably disposed in the cavity to assist in heat transfer from the magnetorheological fluid during clutch operation. A bearing member isolated from the cavity supports the output member on the input member.

6 Claims, 1 Drawing Sheet

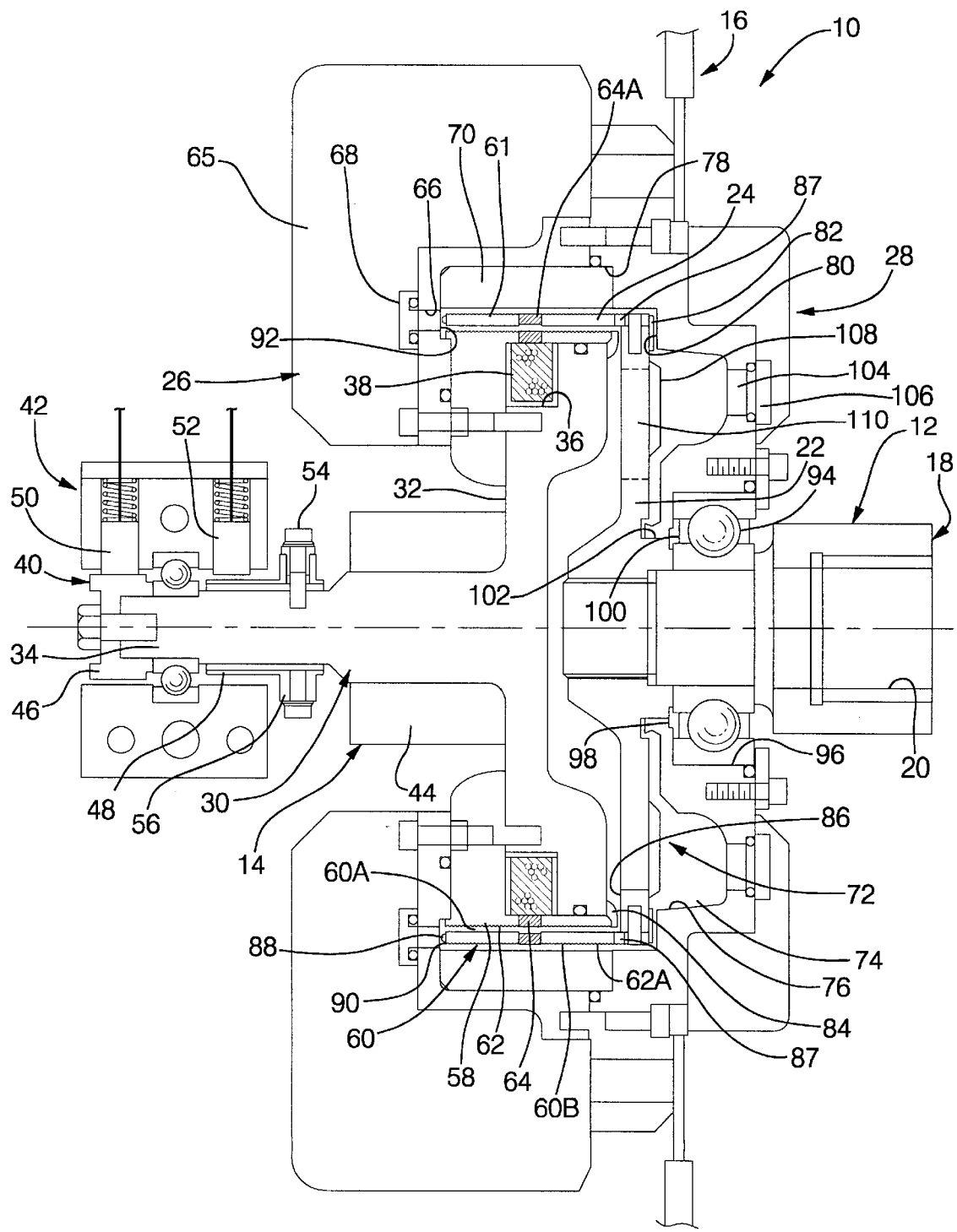

MAGNETORHEOLOGICAL FLUID CLUTCH

TECHNICAL FIELD

This invention relates to fluid clutches and more particularly to fluid clutches having a magnetorheological fluid (MRF) providing a torque transfer medium between the input and output members of the clutch.

BACKGROUND OF THE INVENTION

Many engine driven vehicles use an engine driven fan to provide cooling air flow across a radiator or heat transfer device to remove excess heat from the engine cooling fluid. The fan drive mechanism often has a fluid drive medium disposed between the input and output members of the clutch to control the fan speed relative to the speed of the engine. A viscous fluid, such as silicone, is generally used in these clutch mechanism. The torque capacity of the clutch is in part determined by the amount of viscous fluid filling the working chamber of the clutch. The amount of working fluid admitted to the working chamber is generally controlled by a thermostatic valve mechanism. The rotary speed of the input member of the clutch is equal to or directly proportional to the speed of the engine. As the engine cooling medium is elevated in temperature, the output member of the clutch, and therefore the fan, is increased in speed to increase the cooling air flow through the heat transfer device. These types of viscous fluid clutches are thermostatically controlled and require mechanisms for the admission and removal of the viscous fluid from the torque transfer area between the input and output members of the clutch. While these viscous clutches have performed adequately, there is a desire for more accurate fan speed control.

To provide a more controllable viscous fan clutch, it has been proposed that a magnetorheological fluid (MRF) be introduced between the input and output members of the clutch. The viscosity of the MRF can be controlled through the introduction of a magnetic field. As the viscosity of the MRF is increased, the torque transfer properties of the fluid are increased. Since the magnetic field can be controlled in intensity by a conventional electronic engine management system, the speed of the fan can be established more accurately for a given engine operating condition. Thus, a magnetorheological fluid clutch (MRC) will improve the efficiency of the engine cooling system.

SUMMARY OF THE INVENTION

It is an object of the present invention to provide an improved magnetorheological viscous clutch.

The MRC has an input rotor hub with an annular cylindrical extension positioned in a cylindrical recess formed in one of the components of the clutch output. This establishes two working gaps between the input and output members of the clutch. The gaps are filled with a MRF. One of the output members, a coil housing, has an electromagnet secured therein and a front cover secured thereto. A steel sleeve is secured in the front cover as part of the electromagnetic circuit. The magnetic circuit includes the cylindrical extension of the input member and the MRF. The other of the output members, a nonmagnetic back cover, is attached to the front cover and has the fan attached thereto. The electromagnet is connected to an electrical circuit through slip rings and brushes on the coil housing.

In one aspect of the present invention, the input and output members of the clutch are supported for relative rotation by a bearing member that is shielded from the MRF storage cavity by a wall on the back cover of the output member. In another aspect of the present invention, the storage cavity has a sloping outer peripheral wall to direct MRF into the cylindrical working gaps between the input and output members of the MRC. In yet another aspect of the present invention, a plurality of wipers are disposed between the coil housing and the inner radial wall of the input hub and between the outer radial wall of the input hub and the back cover of the output member to prevent the accumulation and/or centrifugal packing of MRF in these areas.

In still another aspect of the present invention, a series of protrusions are formed on the cylindrical extension of the input member to cooperate with a radial wall on the front cover to prevent the accumulation and/or centrifugal packing of the iron particles of MRF in this area. In a further aspect of the present invention, a plurality of cooling fins are positioned on one radial face of the input member to assist the heat transfer from the working area to maintain the MRF cool. In a yet further aspect of the present invention, the input member and the output member cooperate to form two radially-spaced cylindrical working gaps with an inner cylindrical wall of each gap having a grooved surface to promote the circulation of fluid around the working gaps, reduce the occurrence of hot spots, and lessen the buildup of iron particles on the surfaces of the cylindrical walls.

BRIEF DESCRIPTION OF THE DRAWING

The drawing is a sectional elevational view of a magnetorheological viscous fan clutch incorporating the present invention.

DESCRIPTION OF AN EXEMPLARY EMBODIMENT

A magnetorheological fluid clutch (MRC) 10 has an input member 12 adapted to be driven by an engine or other power source, not shown, and an output member 14 secured to a conventional cooling fan 16. The input member 12 has a rotor 18 incorporating a drive portion 20, a hub portion 22 extending radially from the rotor 18, and a cylindrical drum portion 24 extending axially from the hub portion 22. The output member 14 incorporates a front cover 26, a back cover 28 and a coil assembly 30. The coil assembly 30 has a ferrous hub 32 with a shaft extension 34. The hub 32 includes a cylindrical groove or recess 36 in which is positioned a wire coil 38. A slip ring assembly 40 is positioned on the shaft extension to cooperate with a brush assembly 42 to accomplish the transfer of electrical power to the coil assembly 30. A plurality of cooling fins 44 are formed on the shaft extension 34 to provide for cooling air flow in the area of the brush assembly 42 and prevent air stagnation in this area.

The slip ring assembly 40 has a first ring 46 secured to the shaft extension 34 and a second ring 48 secured to and electrically insulated from the shaft extension 34. The brush assembly 42 is rotatably supported on the shaft extension 34 and includes brushes 50 and 52, spring loaded into abutment with the rings 46 and 48, respectively, to transfer electrical power thereto. A negative electrical terminal 54 is connected with the shaft extension 34 and a positive electrical terminal 56 is formed on the second ring 48. The terminals 54 and 56 are connected to respective ends of the coil 38 by conventional wiring, not shown. The brush assembly 42 is connected with the electrical system of a vehicle and is provided with operating signals from a conventional electronic control module (ECU) which assists in engine operation in a well-known manner. The ECU preferably includes a programmable digital computer that has stored data for establishing the operation of the MRC during operation of the vehicle.

The ferrous hub 32 has an outer cylindrical sleeve 58 secured thereto and forming the radial inner boundary of a working gap 60. The outer surface 61 of the sleeve has spiral grooves 62 formed thereon and a low permeability region 64 formed centrally thereof. The region 64 insures that the flux field of the ferrous hub 32 is distributed properly through the working gap 60. The cylindrical drum 24 has similar spiral grooves 62A formed thereon. These grooves promote the distribution of MRF through the working gap 60. The drum 24 has a similar low permeability region 64A to assure the proper distribution of the flux field in the working gap 60. The front cover 26 is a nonmagnetic component secured to the ferrous hub 32. The front cover 26 has formed thereon a plurality of spaced fins 65 that promote air flow and assist in cooling the MRC 10. A plurality of fill holes 66 are formed in the front cover 26 in axial alignment with the working gap 60. These fill holes 66 permit the introduction of a magnetorheological fluid during the manufacture of the MRC 10. The fill holes 66 are closed with metal balls or plugs 68. A cylindrical sleeve 70 is secured in the front cover 26. The sleeve 70 is composed of magnetic material and forms a portion of the magnetic circuitry, along with the ferrous hub 32, the cylindrical drum 24, and the MRF in the working gaps 60 for the MRC 10.

The back cover 28 is secured with the front cover 26 to enclose the hub portion 22 and the working gap 60. The front and rear covers 26, 28 and the coil assembly 30 cooperate to from a storage cavity 72 for any MRF that happens to recede from the working gap 60 when the MRC 10 is idle. The back cover 28 has an inner cavity 74 that is a portion of the storage cavity 72. The cavity 74 has a conical wall 76 that diverges toward the working gap 60. Centrifugal forces created on the MRF in this area promote the return of the MRF to the working gap 60 during operation of the MRC 10. The back cover 28 has a pilot surface 78 that is in close fit with the sleeve 70 to properly align the front and rear covers 26 and 28. The rear cover also has a radial wall 80 adjacent to and extending radially outward of the conical wall 76. The shoulder formed by the walls 76 and 80 reduce the required fill volume of MRF and also help reduce the centrifugal packing of the iron particles of MRF in this area.

The wall 80 cooperates with a plurality of wipers 82 formed on the hub 22 to prevent the accumulation and/or centrifugal packing of iron particles of MRF in this area. These wipers 82 also encourage the circulation of MRF through the working gap 60. Another plurality of wipers 84 are formed on the ferrous hub 32 for cooperation with an inner wall 86 of the hub 22 to prevent the accumulation of MRF in this area and to promote the circulation of MRF through the working gap 60. The wipers 82 and 84 and their cooperating walls 80 and 86 have a slight running clearance to prevent any significant drag therebetween when the MRC 10 is inoperative or operating at a speed differential between the input member 12 and the output member 14. A plurality of openings 87 are formed in the drum portion 24 adjacent the wipers 84. These openings are sized and shaped to provide flow paths for the flow of MRF from an inner working gap 60A and an outer working gap 60B. This fluid movement avoids splashing of the MRF on the back wall, and improves the heat transfer from the drum 24, in the working gap 60, to the hub 22. A plurality of protuberances 88 are formed on the left face 90 of the drum 24. These protuberances 88 operate in conjunction with a wall 92 on the front cover 26 to prevent the accumulation of MRF in this area and to promote the circulation of MF. A slight running clearance is provided between the protuberances 88 and the wall 92. The running clearances are generally determined by the assembly stack-up tolerances of the cooperating components.

The back cover 28 is rotatably supported on the input member 12 by a roller bearing assembly 94. The back cover 28 has a recess 96 in which the bearing assembly 94 is secured. The recess 96 has a inner wall 98 that surrounds a portion of the left end 100 of the bearing assembly 94. A lip 102 formed on the input member 12 cooperates with the inner wall 98 to enclose the bearing and retard the MRF from reaching the bearing seals. The radial clearance between the lip 102 and the wall 98 is very close and cooperates with the high viscosity of the MRF to prevent the MRF from reaching the bearing seals. The back cover 28 has a plurality of vent openings 104 formed therein to assist in filling the MRC with fluid at assembly. The openings 104 are closed with seal plugs 106 after filling of the working gap 60. The working gap 60 is preferably filled through the fill holes 66 and the air in the working gap 60 is exhausted through the openings 104 during the filling operation.

The hub portion 22 of the input member 12 has a plurality of equiangularly-spaced fins 108 which enhance heat transfer from the MRF to assist in maintaining the temperature thereof in a desired operating range. The hub 22 also has a plurality of openings 110 that reduce the mass thereof and increase the storage capacity for the MRF when the MRC is not rotating.

The MRC 10 is installed in a vehicle, not shown, and adapted to be driven at a speed proportional with engine speed. For example, the drive portion 20 can be driven by a shaft extension from a conventional water pump, or any other engine accessory, or from a pulley arrangement connected directly with the crankshaft.

During operation, when the engine cooling fluid temperature reaches a desirable operating range, the terminals 54 and 56 can be given electrical signals that will create a current flow through the coil assembly 30 and thereby create a magnetic field passing through the MRF in the working gap 60. As is well known, when the MRF is exposed to a magnetic field, the magnetic particles therein will align with the field and increase the viscosity and therefore the shear strength of the MRF, resulting in torque transfer from the input member 12 to the output member 14, causing rotation of the fan 16. The torque transfer ability or characteristic of the MRF varies with the intensity of the magnetic field. Therefore, as the temperature of the engine coolant rises, the electrical energy to the coil assembly is increased automatically by the ECU. This results in an increase in fan speed and an increase in air flow through the vehicle cooling system.

The MRF will often have a tendency to be retained in the corners between the input member hub 22, the ferrous hub 32 and the back cover 28. This is especially true when the working gap 60 has a magnetic field imposed thereon. The wipers 84 and 82 serve to prevent the buildup or packing of MRF in these areas when the fan is rotating by continually removing MRF from these areas and directing it toward the working gap 60. The protuberances 88 provide a similar function between the left face 90 of the drum 24 and the inner face front cover 26.

While the MRF is quite viscous, even when not energized, some of the MRF is likely to migrate into the storage cavity 72 during long periods of idleness. The wall 98 of the back cover 28 and the lip 102 on the hub 22 prevent the MRF from coming into contact with the bearing assembly 94. While the bearing assembly 94 is a sealed unit, it is believed the better practice to maintain the MRF out of contact with the bearing seals.

What is claimed is:

1. A magnetorheological fluid clutch comprising:

a rotatable input member having a drum portion;

a rotatable output member having first and second magnetically permeable members radially inboard and radially outboard of said drum portion, a coil assembly secured with one of said magnetically permeable members, and an electrical source for supplying electrical energy to said coil assembly to effect the establishment of a magnetic field between said magnetically permeable members;

a two-part working gap formed between said drum portion and said magnetically permeable members;

a magnetorheological fluid disposed in said two-part working gap between said drum portion and said magnetically permeable members;

first wiper elements formed on one of said input member and said output member for directing magnetorheological fluid radially outward into a first part of said working gap;

second wiper elements formed on one of said input member and said output member for directing magnetorheological fluid radially outward into a second part of said working gap; and a first plurality of grooves formed in a cylindrical outer surface of said first magnetically permeable member, and a second plurality of grooves formed in a cylindrical outer surface of said drum portion, said first and second grooves being effective during rotation of said input member and said output member to distribute the magnetorheological fluid in said two-part working gap.

2. The magnetorheological fluid clutch defined in claim 1 further comprising:

a plurality of fluid circulating openings formed in said drum portion in substantial radial alignment with said first wiper elements to encourage circulation of a portion of the magnetorheological fluid between said first and second parts of said working gap.

3. The magnetorheological fluid clutch defined in claim 1 further comprising:

said drum portion having an annular end wall facing an annular side wall on said output member; and a plurality of protuberances formed on one of said annular end wall and said annular side wall in close proximity of the other of said walls to inhibit the accumulation of magnetorheological fluid between said walls during relative rotation between said input member and said output member of said magnetorheological fluid clutch.

4. The magnetorheological fluid clutch defined in claim 1 further comprising:

said input member comprising a hub portion secured with said drum portion and an input shaft secured with said hub portion;

said output member comprising a front cover and a back cover secured together to enclose said hub portion and said drum portion, said back cover and said front cover cooperating to form a cavity to store magnetorheological fluid;

a bearing assembly disposed in a recess formed in said back cover between said input shaft and a radial wall on said back cover; and a lip on said input shaft cooperating with said radial wall on said back cover to inhibit the magnetorheological fluid from contacting said bearing assembly.

5. The magnetorheological fluid clutch defined in claim 4 further comprising:

a radially outer wall formed on said back cover at an outer surface of said cavity and being disposed in diverging relation toward said two-part working gap to direct magnetorheological fluid from said cavity toward said two-part working gap when said output member is rotating.

6. The magnetorheological fluid clutch defined in claim 5 further comprising:

a plurality of radially extending fins formed on said hub portion of said input member to enhance heat transfer from the magnetorheological fluid in said two-part working gap.

* * * * *